United States Patent
Shuff

(10) Patent No.: US 10,403,142 B1
(45) Date of Patent: Sep. 3, 2019

(54) ADAPTIVE STOP SIGN AND INTERSECTION TRAFFIC CONTROL SYSTEM

(71) Applicant: Greg Douglas Shuff, Henderson, NV (US)

(72) Inventor: Greg Douglas Shuff, Henderson, NV (US)

(*) Notice: Subject to any disclaimer, the term of this patent is extended or adjusted under 35 U.S.C. 154(b) by 0 days.

(21) Appl. No.: 16/022,428

(22) Filed: Jun. 28, 2018

(51) Int. Cl.

| | | |
|---|---|---|
| *G08G 1/097* | (2006.01) | |
| *G08B 13/196* | (2006.01) | |
| *G08G 1/07* | (2006.01) | |
| *G08G 1/095* | (2006.01) | |
| *H02S 20/10* | (2014.01) | |
| *G06T 7/00* | (2017.01) | |
| *H02S 40/38* | (2014.01) | |
| *G09G 3/3208* | (2016.01) | |

(52) U.S. Cl.
CPC .......... *G08G 1/097* (2013.01); *G06T 7/0004* (2013.01); *G08B 13/19632* (2013.01); *G08G 1/07* (2013.01); *G08G 1/095* (2013.01); *H02S 20/10* (2014.12); *G06T 2207/20084* (2013.01); *G06T 2207/30108* (2013.01); *G09G 3/3208* (2013.01); *H02S 40/38* (2014.12)

(58) Field of Classification Search
CPC .......... G08G 1/097; G08G 1/07; G08G 1/095; G06T 2207/30108; G06T 2207/20084; G06T 7/0004; G08B 13/19632; G09G 3/3208; H02S 20/10; H02S 40/38
See application file for complete search history.

(56) References Cited

U.S. PATENT DOCUMENTS

| | | | | |
|---|---|---|---|---|
| 5,963,345 | A * | 10/1999 | Smith | B60Q 1/50 359/1 |
| 6,031,468 | A * | 2/2000 | Tsao | G09F 13/04 340/321 |
| 9,286,815 | B1 * | 3/2016 | Smith | G09F 19/12 |
| 9,459,623 | B1 * | 10/2016 | Raghu | G05D 1/0088 |
| 2004/0101166 | A1 * | 5/2004 | Williams | G01P 3/38 382/104 |
| 2009/0139125 | A1 * | 6/2009 | Haubrich | G09F 7/00 40/612 |
| 2010/0214127 | A1 * | 8/2010 | Lloyd | G08G 1/07 340/925 |
| 2010/0283631 | A1 * | 11/2010 | Bryant | G08G 1/07 340/916 |
| 2014/0071286 | A1 * | 3/2014 | Bernal | G06T 7/20 348/149 |
| 2016/0005313 | A1 * | 1/2016 | Cholayil | G08G 1/095 340/907 |
| 2017/0046954 | A1 * | 2/2017 | Leversen | G08G 1/095 |
| 2019/0023266 | A1 * | 1/2019 | Kouri | G08G 1/04 |

\* cited by examiner

*Primary Examiner* — Oschta I Montoya
(74) *Attorney, Agent, or Firm* — Gokalp Bayramoglu

(57) ABSTRACT

An adaptive stop sign including a stop sign plate and at least one light indicator. The stop sign plate is divided into a plurality of sections. The adaptive stop sign is connected to a traffic signal control system (TSCS). In an active mode, the adaptive stop sign works as a traffic control signal and the TSCS switches on the at least one light indicator according to a traffic control signal. In an inactive mode, the adaptive stop sign works as a normal sign and the TSCS switches off the at least one light indicator.

26 Claims, 14 Drawing Sheets

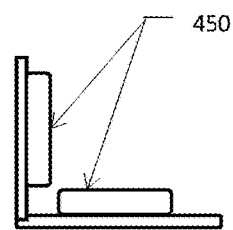
Fig 7C
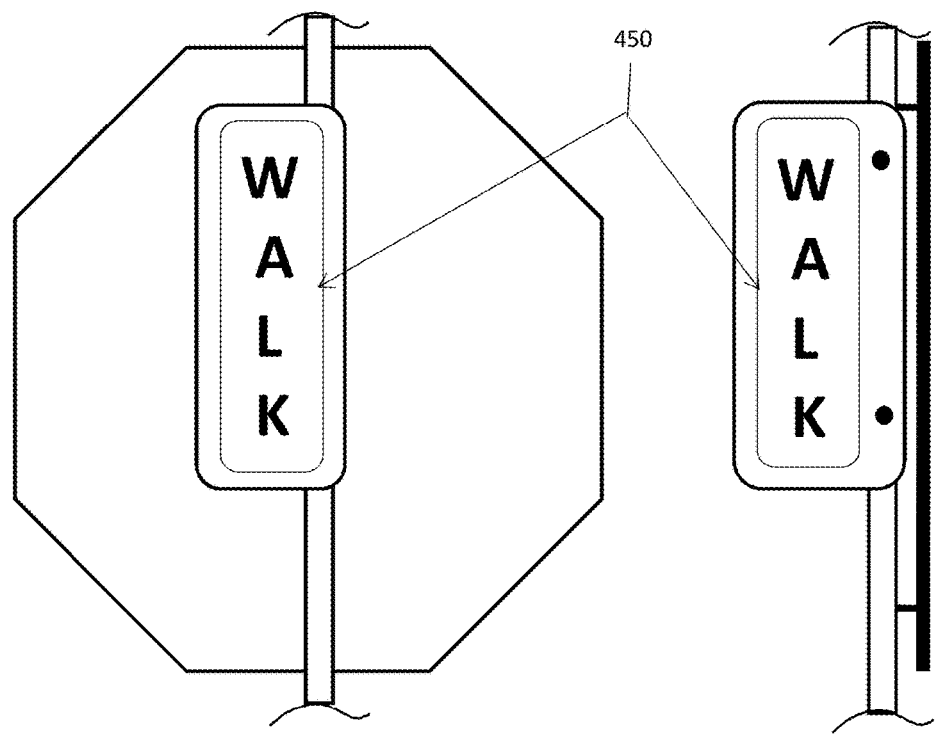
Fig 7A
Fig 7B

ADAPTIVE STOP SIGN AND INTERSECTION TRAFFIC CONTROL SYSTEM

TECHNICAL FIELD

The present invention relates to sign devices and more particularly to an adaptive stop sign for directing vehicles to stop or move on the road and an intersection traffic control system implementing the adaptive stop sign.

BACKGROUND

A stop sign is a traffic sign to notify drivers that they must come to a complete stop and make sure no other vehicles are coming before proceeding. Stop signs are mainly used to control the traffic at intersections that are not busy enough to justify the installation of a traffic signal. Generally, the stop sign is not intended for use as a traffic calming device; it is intended to be installed mainly for safety and/or to assign right-of-way for a certain direction. Stop signs are commonly deployed as safety measures in residential areas and near schools, making extra precautions necessary. Stop signs are usually erected on all intersecting roads, resulting in three-way or four-way stops. Currently, the effectiveness of stop signs depends solely on the reaction of the drivers driving the vehicles. A driver is supposed to stop at the stop sign and look around to see whether he/she can move ahead, depending on the traffic at the intersection. Further, the drivers on each branch of the intersection need to manually decide amongst themselves about whose turn is it to cross the intersection. So, the effective implementation of the stop signs and road safety at stop signs is mainly in the hands of the drivers and is seriously affected by the attention and driving skills of the drivers.

Presently, Autonomous Vehicles or vehicles that drive themselves are being tested and are in limited production. In the future, these autonomous vehicles will take over our highways. Advanced Sensors, Artificial Intelligence, Neural Networks, Deep Learning and Advanced Communications Links make all this possible. Vehicles are being provided with the latest computer and sensor technology that allows them to drive themselves. The currently available stop signs will not be successful with the upcoming autonomous vehicles or self-driven vehicles. As in self-driven vehicles, the vehicle is not driven by a human, these vehicles cannot rely on the human judgment to follow traffic rules at stop signs. To make a self-driven vehicle intelligent enough to deal with stop signs will add a lot of complexity to self-driven vehicles, requiring complex hardware and software support. Further, the chances of an accident may increase, as each vehicle may behave differently based on the hardware and software employed within the vehicle. Also, some intersections are busier than others, and a same intersection may be busier at certain peak traffic hours. Currently available stop signs do not consider the dynamic traffic variation at the intersections, thus causing long traffic lines during peak traffic hours. This may lead to fuel waste in the vehicles, as well as increasing the air pollution caused by the vehicles.

SUMMARY

Various embodiments provide an adaptive stop sign and an intersection traffic control system made using the adaptive stop sign thereof.

In one of the embodiments, an adaptive stop sign includes a stop sign plate and at least one light indicator. The stop sign plate is divided into a plurality of sections. The adaptive stop sign includes a traffic signal control system (TSCS) comprised of a separately located programmable logic controller (PLC) system and/or an attached rear mounted computer module. In an active mode, the adaptive stop sign works as a traffic control signal and the TSCS switches on the at least one light indicator according to a traffic control signal. In an inactive mode, the adaptive stop sign works as a normal sign and the TSCS switches off the at least one light indicator.

Preferably, the plurality of sections include a top section, a center section and a bottom section.

Preferably, the at least one light indicator includes at least one red light indicator, at least one yellow light indicator, and at least one green light indicator.

Preferably, a top imaginary or physical boundary line separates the top section and the center section. A bottom imaginary or physical boundary line separates the center section from the bottom section. The top section is provided with the at least one red light indicator. The center section is provided with the at least one yellow light indicator. The bottom section is provided with the at least one green light indicator.

Preferably, the word STOP is embedded in the center section between the top boundary line and the bottom boundary line.

Preferably, in the inactive mode the TSCS switches off the at least one red light indicator, the at least one yellow light indicator, and the at least one green light indicator, and only the word STOP is visible.

Preferably, in a condition of malfunctioning of the adaptive stop sign, the TSCS switches the adaptive stop sign to work in the inactive mode.

Preferably, the at least one red light indicator includes a plurality of red light emitting diode (LED) lights, the at least one yellow light indicator includes a plurality of yellow LED lights and the at least one green light indicator includes a plurality of green LED lights respectively.

Preferably, the adaptive stop sign may further include an intelligent adaptive stop light monitoring camera mounted above the stop sign plate to continuously monitor the red LED lights, the yellow LED lights and the green LED lights provided in the top section, the center section and the bottom section respectively for lighting malfunction or timing malfunction. In case of detecting the lighting malfunction or the timing malfunction, the intelligent adaptive stop light monitoring camera sends a malfunctioning signal indicating the condition of malfunctioning of the adaptive stop sign to the TSCS; and in-turn transmits a malfunction code to a control signal monitoring center for resolution.

Preferably, the adaptive stop sign may further include an intelligent security camera mounted above the stop sign plate to continuously observe a rear side of the adaptive stop sign for detecting a security breach including vandalism, spray painting or damage to circuitry mounted on the rear side of the adaptive stop sign. The intelligent security camera is configured to detect and recognize the security breach and send a security breach code to the TSCS and in-turn transmit the security breach code to a control signal monitoring center for resolution.

Preferably, the adaptive stop sign may further include a support pole. The stop sign plate is mounted on the support pole. All electrical power wiring, traffic signal control wiring, light monitoring camera wiring, and security camera wiring is enclosed within the support pole.

Preferably, the intelligent adaptive stop light monitoring camera adaptive stop sign may further include a neural net module mounted above the stop sign plate to continuously monitor the red LED lights, the yellow LED lights and the green LED lights provided in the top section, the center section and the bottom section respectively for lighting malfunction or timing malfunction, and to continuously observe a rear side of the adaptive stop sign for detecting a security breach including vandalism, spray painting or damage to a circuitry mounted on the rear side of the adaptive stop sign through the cameras. In case of detecting the lighting malfunction or the timing malfunction, the neural net module sends a malfunctioning signal indicating the condition of malfunctioning of the adaptive stop sign to the TSCS. The neural net module is configured to detect and recognize the security breach and send a security breach code to the TSCS and in-turn transmit the security breach code to a control signal monitoring center for resolution.

Preferably, the adaptable stop sign also includes a microphone that is either freestanding or integrated with the intelligent adaptive stop light monitoring camera. A microphone may also be incorporated either separately or integrated with the intelligent security camera. The microphone can detect useful information (e.g. traffic horns or the sound of paint discharging from spray paint canisters) and relay that information to the intelligent adaptive stop light monitoring camera or the intelligent security camera.

Preferably, the plurality of red LED lights, the plurality of yellow LED lights and the plurality of green LED lights may be provided at the sides forming boundaries of the stop sign plate are disposed at the edges of the stop sign plate.

Preferably, the plurality of red LED lights, the plurality of yellow LED lights and the plurality of green LED lights may be provided in form of LED light strips with wide angle patterns of light distribution with a concentration of light power directed from the edges of the stop sign plate to directly in a front direction of the adaptive stop sign, and vary in brightness in accordance with sunlight. The light emitting diode light strips are clearly visible from a distance of at least 300 feet.

Preferably, each LED light strip may include a flexible plastic material affixed with LED lights. Depending on sign location, the flexible plastic material containing the LED lights would be colored or painted to match the stop sign background color, usually either red or white. Preferably, the adaptive stop sign may further include an Organic light emitting diode (OLED) transparent flat panel display affixed on the stop sign plate such that the word STOP is clearly visible through the OLED transparent flat panel display when the display is in an "off" state. When the OLED transparent flat panel display is in an "on" state, the OLED display works as a traffic signal display. To display a red light of the traffic control signal corresponding to a stop signal, a top part of the OLED display covering the top section is activated to display red color, a center part of the OLED display covering the center section and a bottom part of the OLED display covering the bottom section are activated to display black or gray color. To display a yellow light of the traffic control signal corresponding to a ready signal, the center part of the OLED display covering the center section is activated to display yellow color, the top part of the OLED display covering the top section and the bottom part of the OLED display covering the bottom section are activated to display black or gray color. To display a green light of the traffic control signal corresponding to a go signal, the bottom part covering the bottom section is activated to display green color, the top part of the OLED display covering the top section and the center part of the OLED display covering the center section are activated to display black or gray color.

Preferably, the OLED transparent flat panel display goes into the off state when the adaptive stop signal is in the inactive mode.

Preferably, the at least one red light indicator is a red LED light module affixed on the top section, the at least one yellow indicator is a yellow LED light module affixed on the center section, and the at least one green light indicator is a green LED light module affixed on the bottom section.

Preferably, the red LED light module, the yellow LED light module and the green LED light module are rectangular or circular in shape Preferably, the adaptive stop sign may further include a solar panel installed on top of the adaptive stop sign and/or the adaptive stop sign's pole. The solar panel provides the electric power for the OLED transparent flat panel display and/or the plurality of LED lights.

Preferably, the TSCS is attached to a rear end of the stop sign plate and the TSCS activates the plurality of LED lights in a proper sequence and time to allow traffic flow through an intersection. The TSCS includes two independent hardware platforms, each independent hardware platform has a CPU (Central Processing Unit) and a time clock to determine the time and sequence of the LED lights, changing from GREEN to YELLOW to RED, and then to GREEN to continue a cycle. The two independent hardware platforms include a first independent hardware platform working as a main controlling unit and a second independent platform working as a backup control unit; in case of a failure of the first independent hardware platform, the second independent hardware platform starts working as the main control unit.

Preferably, the adaptive stop sign may further include a traffic flow sensor system (TFSS) module located on the rear of the stop sign plate and integrated into the TSCS to enhance the signal timing by detecting a vehicle presence, speed of the vehicles, a heading direction of the vehicles, location of the vehicles, a turn signal status of the vehicles, a type of the vehicles, a size of the vehicles and a number of the vehicles in a traffic lane. The TFSS module is integrated with the TSCS by hard wire or wireless communication link.

Preferably, the TFSS module may include a plurality of sensors including a first camera for detecting a vehicle data including the vehicle presence, the number of the vehicles, the location of the vehicles, the type of the vehicles, the size of the vehicles and the turn signal status of the vehicles. The vehicle data is used to control the traffic signal sequence and timing. The TSCS uses the vehicle data to dynamically control the traffic signal sequence and timing.

Preferably, the TFSS module may further include a second camera. The first camera and the second camera are focused on a same space to provide a three-dimensional sensing of the vehicles to determine a part of the vehicle data including the speed of the vehicles, the heading direction of the vehicles and an estimated time each vehicle will take to reach the intersection.

Preferably, the TFSS module may further include a radar for detecting the vehicle data including the vehicle presence, the location of the vehicles, the speed of the vehicles, an estimated time each vehicle will take to reach the intersection.

Preferably, the TFSS module may further include a lidar for detecting the vehicle data including the vehicle presence, the location of the vehicles, the speed of the vehicles, an estimated time each vehicle will take to reach the intersection.

Preferably, the TFSS module may further include environmental sensors to detect weather condition data including rain, snow, fog, and blowing sand. The TSCS uses the weather condition data to control the illumination of the plurality of LED lights and to work in conjunction with a vision processing unit to detect, recognize, and analyze the vehicle data including the vehicle presence, the number of vehicles, the type of the vehicles, the location of the vehicles, the speed of the vehicles and the expected time to reach the intersection for each vehicle.

Preferably, at least three red LED lights are provided at each side along the periphery of the top section, at least three yellow LED lights are provided at each side along the periphery of the center section, and at least three green LED lights are provided at each side along the periphery of the bottom section.

Preferably, the stop sign plate is an octagonal stop sign plate.

In one of the embodiment, the intersection traffic control system includes a plurality of adaptive stop signs installed at an intersection. Each adaptive stop sign includes a stop sign plate and at least one light indicator. The stop sign plate is divided into a plurality of sections. The adaptive stop sign includes a traffic signal control system (TSCS). In an active mode, the adaptive stop sign works as a traffic control signal and the TSCS switches on the at least one light indicator according to a traffic control signal. In an inactive mode, the adaptive stop sign works as a normal sign and the TSCS switches off the at least one light indicator. The TSCS of one of the adaptive stop sign works as a master TSCS for the intersection traffic control system and the TSCS of the other adaptive stop signs works as slave TSCS's for the intersection traffic control system. All the TSCSs include a Master/Slave switch allowing the master TSCS to control the timing of the light indicators for the plurality of adaptive stop signs. Each TSCS includes a transmitter and a receiver. The master TSCS transmits a signal code to implement a change of signal to the slave TSCSs and the slave TSCSs transmits confirmation signal codes to the master TSCS to acknowledge and verify a light change.

Preferably, the stop sign plate is divided into a top section, a center section and a bottom section. An imaginary or physical top boundary line separates the top section and the center section. An imaginary or physical bottom boundary line separates the center section from the bottom section. The top section is provided with at least one red light indicator. The center section is provided with at least one yellow light indicator. The bottom section is provided with at least one green light indicator. A word STOP is embedded in the center section between the imaginary or physical top boundary line and the imaginary or physical bottom boundary line. In the inactive mode the adaptive stop sign works as a normal stop sign and the TSCS switches off the at least one red light indicator, the at least one yellow light indicator, and the at least one green light indicator, and only the word STOP is visible.

Preferably, in a condition of malfunctioning of the adaptive stop sign, the TSCS switches the adaptive stop sign to work in the inactive mode.

The master TSCS has a programming capability for all aspects of the intersection traffic control system including light timings, flashing/blinking lights, and hours of operation.

In case the master TSCS does not receive the confirmation signal codes from the slave TSCS or receivers a slave TSCS malfunction signal, the master TSCS initiates a shut-down sequence, sending the plurality of adaptive stop signs to work in the inactive mode.

Preferably, the at least one red light indicator includes a plurality of red light emitting diode (LED) lights, the at least one yellow light indicator includes a plurality of yellow LED lights and the at least one green light indicator includes a plurality of green LED lights respectively.

Preferably, the intersection traffic control system may further include a remote-control unit for testing and verifying operations of the intersection control system remotely, and to remotely and manually control the lights by police or emergency vehicles and/or personnel.

BRIEF DESCRIPTION OF THE DRAWINGS

For a better understanding of the invention and to show how it may be performed, embodiments thereof will now be described, by way of non-limiting example only, with reference to the accompanying drawings, in which:

FIG. 7A shows a rear view of the adaptive stop sign showing pedestrian signal according to another embodiment;

FIG. 7B shows a side view of the adaptive stop sign showing pedestrian signal according to another embodiment;

FIG. 7C shows a cross view of the pedestrian signal from top according to another embodiment;

DETAILED DESCRIPTION

Figure 1:
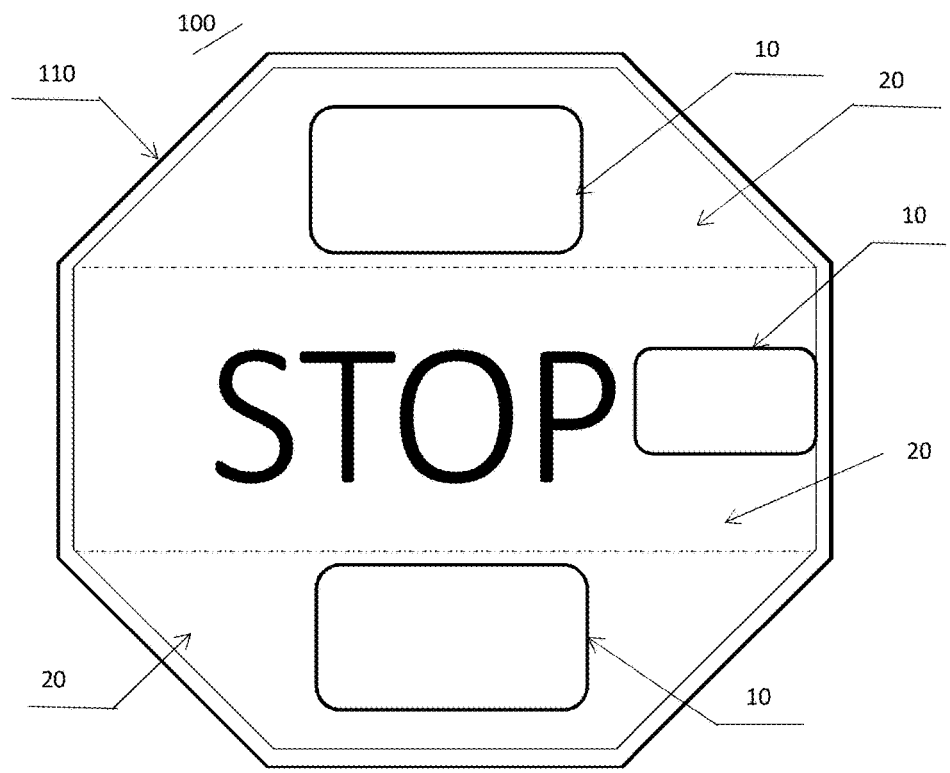
FIG. 1 shows an adaptive stop sign according to an embodiment
Figure 2:
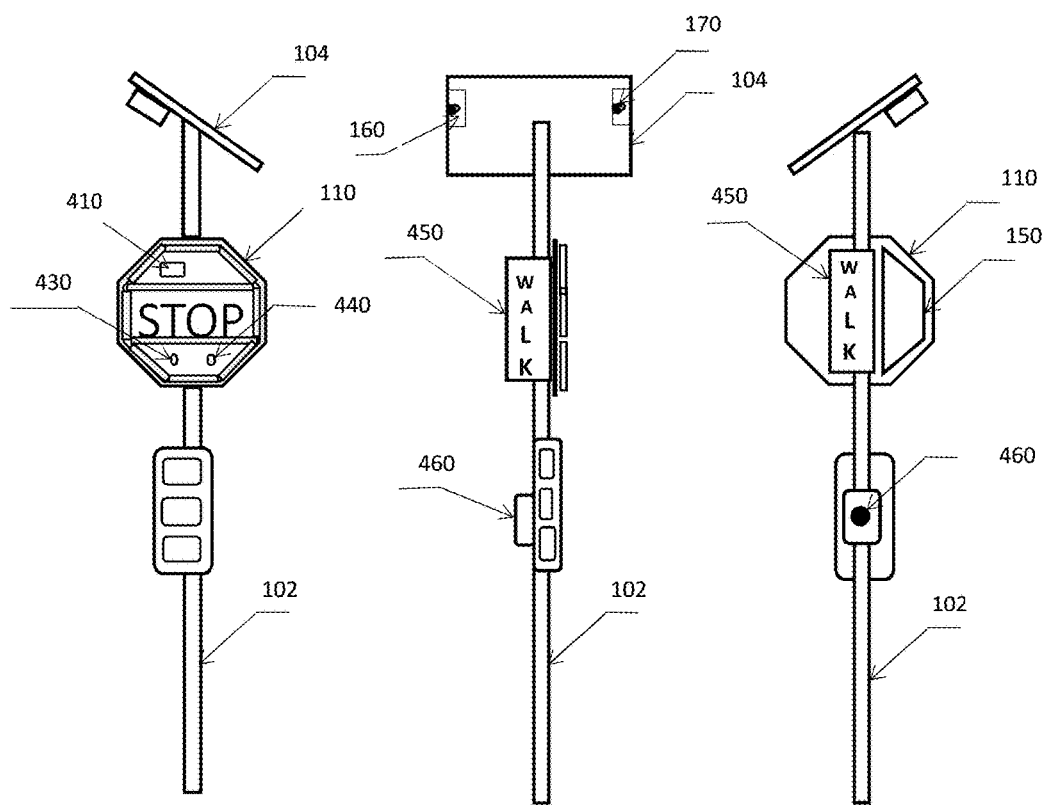
FIG. 2A shows a front view of an adaptive stop sign according to another embodiment.
FIG. 2B shows a side view of the adaptive stop sign according to the embodiment.
FIG. 2C shows a rear view of the adaptive stop sign according to the embodiment.

Referring to FIGS. 1-14, adaptive stop sign 100 includes stop sign plate 110 and at least one light indicator 10. The stop sign plate is divided into a plurality of sections 20. The adaptive stop sign includes a traffic signal control system (TSCS) 150. In an active mode, the adaptive stop sign works as a traffic control signal and the TSCS 150 switches on the at least one light indicator according to a traffic control signal. In an inactive mode, the adaptive stop sign works as a normal sign and the TSCS 150 switches off the at least one light indicator.

In another embodiment, the TSCS can be a programmable logic controller (PLC) system, generally located on the side of the road. Alternatively, the TSCS can be a computer module mounted to the adaptive stop sign. A computer module that would have the same or greater function as a current PLC.

In another embodiment, the stop sign plate 110 is divided into three sections namely top section 112, center section 114 and bottom section 116.

In another embodiment, the at least one light indicator includes at least one red light indicator 130, at least one yellow light indicator 132, and at least one green light indicator 134.

In another embodiment, top boundary line 120 separates the top section 112 and the center section 114. Bottom boundary line 122 separates the center section 114 from the bottom section 116. The top section 112 is provided with at least one red light indictor 130. The center section 114 is provided with at least one yellow light indicator 132. The bottom section 116 is provided with at least one green light indicator 134. The top boundary line 120 and the bottom boundary line 122 are actual lines or imaginary lines dividing the stop sign plate 110 into three sections.

In another embodiment, the word STOP 140 is embedded in the center section 114 between the top boundary line 120 and the bottom boundary line 122.

The adaptive stop sign 100 is provided with a traffic signal control system (TSCS) 150. The adaptive stop sign 100 is configured to work in an active mode or an inactive mode. In the active mode, the adaptive stop sign 100 works as a traffic control signal and the TSCS 150 switches on the at least one red light indicator 130, at least one yellow light indicator 132, or at least one green light indicator 134 according to a traffic control signal. In the inactive mode the adaptive stop sign 100 works as a normal stop sign and the TSCS 150 switches off at least one red light indicator 130, at least one yellow light indicator 132, and at least one green light indicator 134, and only the word STOP 140 is visible. In a condition of malfunctioning of the adaptive stop sign 100, the TSCS 150 switches the adaptive stop sign 100 to work in the inactive mode.

In another embodiment, the at least one red light indicator 130 are red light emitting diode (LED) lights, the at least one yellow light indicator 132 are yellow light emitting diode (LED) lights, and the at least one green light indicator 134 are green light emitting diode (LED) lights.

In another embodiment, an intelligent adaptive stop light monitoring camera 160 is mounted on a bracket above the stop sign plate 110 to continuously monitor the red LED lights 130, the yellow LED lights 132 and the green LED lights 134 provided in the top section 112, the center section 114, and the bottom section 116 respectively for lighting malfunction or timing malfunction. In case of detecting the lighting malfunction or the timing malfunction, the intelligent adaptive stop light monitoring camera 160 sends a malfunctioning signal indicating the condition of malfunctioning of the adaptive stop sign 100 to the TSCS 150, and in-turn the TSCS 150 can transmit the malfunctioning code to a control signal monitoring center for resolution.

In another embodiment, an intelligent security camera 170 is mounted on the bracket above the stop sign plate 110 to continuously observe a rear side of the adaptive stop sign 100 for detecting a security breach including vandalism, spray painting or damage to a circuitry mounted on the rear side of the adaptive stop sign. The intelligent security camera 170 is configured to detect and recognize the security breach and send a security breach code to the TSCS 150 and in-turn transmit the security breach code to a control signal monitoring center for resolution.

In another embodiment, the adaptive stop sign 100 further include a support pole 102. The stop sign plate 110 is mounted on the support pole 102. All electrical power wiring, traffic signal control wiring, light monitoring camera wiring, and security camera wiring is enclosed within the support pole 102.

In another embodiment, intelligent adaptive stop light monitoring camera 160 and intelligent security camera 170 include a monitoring microphone 161 and/or a security microphone 171 respectively that are either independent or integrated with the intelligent adaptive stop light monitoring camera 160 or the intelligent security camera 170 respectively. Monitoring microphone 161 and security microphone 171 can detect useful information (e.g. traffic horns or the sound of paint discharging from spray paint canisters, etc.) and relay that information to the intelligent adaptive stop light monitoring camera 160 or the intelligent security camera 170.

In another embodiment, the adaptive stop sign 100 includes a neural net module 190 mounted on the bracket above the stop sign plate 110 to continuously monitor the red LED lights 130, the yellow LED lights 132 and the green LED lights 134 provided in the top section 112, the center section 114, and the bottom section 116 respectively for lighting malfunction or timing malfunction, and to continuously observe a rear side of the adaptive stop sign 100 for detecting a security breach including vandalism, spray painting or damage to a circuitry mounted on the rear side of the adaptive stop sign. In case of detecting the lighting malfunction or the timing malfunction, the neural net module sends a malfunctioning signal indicating the condition of malfunctioning of the adaptive stop sign to the TSCS 150. The neural net module is configured to detect and recognize the security breach and send a security breach code to the TSCS 150 and in-turn transmit the security breach code to a control signal monitoring center for resolution. Alternatively, neural net module 190 can be integrated into intelligent adaptive stop light monitoring camera 160 and intelligent security camera 170 respectively.

In another embodiment, the plurality of red LED Edge lights 1122, the plurality of yellow LED Edge lights 1144 and the plurality of green LED Edge lights 1166 provided at the sides forming boundaries of the stop sign plate 110 are disposed at the edges (Edge 1, Edge 2, Edge 3) of the stop sign plate 110. Edge lights are pointed in a sideways direction so that a driver right alongside the sign can see what the sign is indicating and is clearly visible to the driver, where other LED lights point in an outward direction towards the oncoming traffic.

In another embodiment, the plurality of red LED lights 130, the plurality of yellow LED lights 132, and the plurality of green LED lights 134 are provided in form of LED light strips with wide angle patterns of light distribution with a concentration of light power directed from the edges of the stop sign plate to directly in a front direction of the adaptive stop sign and vary in brightness in accordance with sunlight. The light emitting diode light strips 180 are clearly visible from a distance of at least 300 feet. Each LED light strip includes a flexible plastic material affixed with LED lights. The color of the strips to which the LED lights are attached are selected to match the background to which they are mounted.

In another embodiment, an Organic light emitting diode (OLED) transparent flat panel display 200 is affixed on the stop sign plate 110 such that the word STOP 140 is clearly visible through the OLED transparent flat panel display 200 when the display is in an off state. When the OLED transparent flat panel display 200 is in an on state, the OLED display 200 works as a traffic signal display. To display a red light of the traffic control signal corresponding to a stop signal, a top part 210 of the OLED display 200 covering the top section 112 is activated to display red color, a center part 220 of the OLED display 200 covering the center section 114 and a bottom part 230 of the OLED display 200 covering the bottom section 116 are activated to display black or gray color. To display a yellow light of the traffic control signal corresponding to a ready signal, the center part 220 of the OLED display 200 covering the center section 114 is activated to display yellow color, the top part 210 of the OLED display 200 covering the top section 112 and the bottom part 230 of the OLED display 200 covering the bottom section 116 are activated to display black or gray color. To display a green light of the traffic control signal corresponding to a go signal, the bottom part 230 of the OLED display 200 covering the bottom section 116 is activated to display green color, the top part 210 of the OLED display 200 covering the top section 112, and the center part 220 of the OLED display 200 covering the center section 114 are activated to display black or gray color.

The OLED transparent flat panel display 200 goes into the off state when the adaptive stop signal 100 is in the inactive mode.

In another embodiment, the adaptive stop sign 100 includes multi-LED row rectangular or circular light modules affixed with RED LED Light Module 310 on the top section 112, YELLOW LED Light Module 320 on the center section 114, and GREEN LED Light Module 330 on the bottom section 116.

In another embodiment, the adaptive stop sign 100 further includes a solar panel 104 installed on top of the adaptive stop sign pole. The solar panel 104 provides the electric power for the OLED transparent flat panel display 200 and/or the plurality of LED lights.

In another embodiment, the TSCS 150 is attached to a rear end of the stop sign plate 110 and the TSCS 150 activates the plurality of LED lights in a proper sequence and time to allow traffic flow through an intersection. The TSCS 150 includes two independent hardware platforms, each independent hardware platform has a CPU (Central Processing Unit) and a time clock to determine the time and sequence of the LED lights, changing from GREEN to YELLOW to RED, and then to GREEN to continue a cycle. The two independent hardware platforms include a first independent hardware platform working as a main controlling unit and a second independent platform working as a backup control unit; in case of a failure of the first independent hardware platform, the second independent hardware platform starts working as the main control unit.

In another embodiment, the adaptive stop sign 100 further includes traffic flow sensor system (TFSS) module 400 located on the rear of the stop sign plate 110 and integrated into the TSCS 150 to enhance the signal timing by detecting a vehicle presence, speed of the vehicles, a heading direction of the vehicles, location of the vehicles, a turn signal status of the vehicles, a type of the vehicles, a size of the vehicles and a number of the vehicles in a traffic lane. The TFSS module 400 is integrated with the TSCS 150 by hard wire or via a wireless communication link.

In another embodiment, the TFSS module 400 may include a plurality of sensors to include a first camera 430 for detecting a vehicle data including the vehicle presence, the number of the vehicles, the location of the vehicles, the type of the vehicles, the size of the vehicles and the turn signal status of the vehicles. The vehicle data is used to control the traffic signal sequence and timing. The TSCS 150 uses the vehicle data to dynamically control the traffic signal sequence and timing. The Single camera is EO (Electro Optical—standard vision) Camera and is used to detect vehicle presence, number of vehicles, and vehicle locations and may be a color or black & white camera. When detected, this data will be processed and implemented in a Signal & Timing Sequence algorithm to change signal status. For example, if the camera on the Master Adaptive Stop Sign detects the presence of numerous vehicles, and the cross-street Slave Adaptive Stop Sign detects no vehicle presence, the Master TSCS will keep the GREEN Light "ON" until the Slave TSCS transmits a Vehicle Present Code then the Master TSCS will implement a change of Light sequence. Many EO Cameras today capture imagery in low light and high resolution making day/night operations possible particularly in well-lit areas. EO Cameras detect vehicle headlights at night, but are challenged with environmental conditions like fog, heavy rain or snow, smoke and dust.

In another embodiment, the TFSS module further includes a second camera. The first camera 430 and the second camera 440 are focused on a same space to provide a three-dimensional sensing of the vehicles to determine a part of the vehicle data including the speed of the vehicles, the heading direction of the vehicles and an estimated time each vehicle will take to reach the intersection. The second camera is IR (Infrared) Camera. Instances where EO Cameras fall short, IR Cameras shine or more particularly, IR Cameras work well in situations with fog, heavy rain or snow, smoke and dust and the darkness of night by detecting heat. IR Cameras have also come down in price and more practical to implement.

In another embodiment, TFSS includes stereo cameras including EO & IR cameras. Two paired cameras are configured to view the same space providing for depth of field or vehicle distance from the Adaptive Stop Sign and used to detect the number of vehicles, vehicle speed, heading direction, type, size & calculate estimated time to intersection threshold. For example, if a bus is detected or a truck is detected, traveling at a high rate of speed, the TSCS may hold the GREEN Light "ON" until the Bus and/or Truck clears the intersection before implementing the change of Light sequence. If vehicles slow sufficiently this could indicate another vehicle in the intersection turning Left or Right and the TSCS could respond by switching signal status.

In another embodiment, the TFSS module 400 further include radar 410 for detecting the vehicle data including the vehicle presence, the location of the vehicles, the speed of the vehicles, an estimated time each vehicle will take to reach the intersection. Radar has the advantage of working in all weather conditions and detects vehicle presence at 500+ feet.

In another embodiment, the TFSS module 400 further includes lidar 420 for detecting the vehicle data including the vehicle presence, the location of the vehicles, the speed of the vehicles, an estimated time each vehicle will take to reach the intersection. Lidar works in all weather conditions and detects vehicle presence up to 250 feet.

In another embodiment, the TFSS module 400 further includes environmental sensors to detect a weather condition data including rain, snow, fog, and blowing sand. The TSCS 150 uses the weather condition data to control an illumination of the plurality of LED lights and to work in conjunction with a vision processing unit to detect, recognize and analyze the vehicle data including the vehicle presence, the number of vehicles, the type of the vehicles, the location of the vehicles, the speed of the vehicles and the expected time to reach the intersection for each vehicle.

In another embodiment, the TFSS module includes a GPS device to enhance the TSCS time clock by synchronizing to very accurate GPS timing signals to coordinate with other intersection traffic signals as an accurate time standard and to provide accurate TFSS Module—GPS location.

In another embodiment, the stop sign plate is an octagonal shaped stop sign plate.

In one of the embodiment, the intersection traffic control system includes plurality of adaptive stop signs 100 installed at an intersection. Each adaptive stop sign includes stop sign plate 110. The stop sign plate is divided into top section 112, center section 114 and bottom section 116. Top boundary line 120 separates the top section 112 and the center section 114. Bottom boundary line 122 separates the center section 114 from the bottom section 116. The top section 112 is provided with at least one red light indicator 130. The center section 114 is provided with at least one yellow light indicator 132. The bottom section 116 is provided with at least one green light indicator 134. The word STOP 140 is embedded in the center section 114 between the top boundary line 120 and the bottom boundary line 122. The adaptive stop sign 100 includes a traffic signal control system (TSCS) 150. The adaptive stop sign 100 is configured to work in an active mode or an inactive mode. In the active mode the adaptive stop sign 100 works as a traffic control signal and the TSCS 150 switches on the at least one red light indicator 130, the at least one yellow light indicator 132, or the at least one green light indicator 134 according to a traffic control signal. In the inactive mode the adaptive stop sign 100 works as a normal stop sign and the TSCS 150 switches off the at least one red light indicator 130, the at least one yellow light indicator 132, and the at least one green light indicator 134, and only the word STOP 140 is visible. In a condition of malfunctioning of the adaptive stop sign, the TSCS 150 switches the adaptive stop sign to work in the inactive mode. The TSCS of one of the adaptive stop sign works as a master TSCS 150 for the intersection traffic control system and the TSCSs of the other of the adaptive stop signs works as a slave TSCS for the intersection traffic control system. All the TSCSs include a Master/Slave switch allowing the master TSCS to control the timing of the lights for the plurality of adaptive stop signs. Master/Slave switch allows one Master TSCS at each intersection to control the timing of light indicators for the Master Adaptive Stop Sign and all other intersection Slave Adaptive Stop Signs (Slave TSCSs). All Slave Adaptive Stop Signs light indicators are controlled by the Master TSCS. The master TSCS has a programming capability for all aspects of the intersection traffic control system including light timings, flashing/blinking lights, and hours of operation. Dual or Triple Redundancy Programming is implemented to program all TSCSs to increase reliability. The Master TSCS controls all intersection Adaptive Stop Signs and aspects of the systems to include light indicator (Signal) timing, Flashing/Blinking Signals, and hours of operation. For example, the system may be activated for rush hour traffic only (i.e., between 6-9 am and 3-6 pm) and as a Standard Stop Sign at all other times. Each TSCS includes a transmitter and a receiver. The master TSCS transmits a signal code to implement a change of signal to the slave TSCSs and the slave TSCSs transmits confirmation signal codes to the master TSCS to acknowledge and verify a light change. For example, when the Master TSCS changes the Light (Signal) from YELLOW to RED, the Master TSCS transmits a signal code to Slave TSCSs to change their Lights (Signals) appropriately (from RED to GREEN for cross section traffic with a second or two of delay) and the Slave TSCSs will transmit confirmation signals back to the Master TSCS confirming that the LED Lights have been changed. In case the master TSCS does not receive the confirmation signal codes from the slave TSCS or receivers a slave TSCS malfunction signal, the master TSCS initiates a shut-down sequence, sending the plurality of adaptive stop signs to work in the inactive mode. If signs are OLED displays, then these displays may stay active and display the Stop Sign Face with the word "STOP" in White and Red background and White periphery.

In another embodiment the at least one red light indicator 130 are red light emitting diode (LED) lights, the at least one yellow light indicator 132 are yellow light emitting diode (LED) lights, and the at least one green light indicator 134 are green light emitting diode (LED) lights. The intersection traffic control system further includes a remote-control unit 1300 for testing and verifying operations of the intersection control system remotely, and to manually control the lights by police or emergency vehicles and/or personnel.

In another embodiment, the adaptive stop sign includes pedestrian signal indicator 450 and pedestrian control button 460 attached to the pole. Pedestrian "WALK" and "STOP" signals to give pedestrians visual signal status as to when it is safe to cross the street.

FIG. 2A-2C show front view, side view &rear view of the pole mounted Adaptive Stop Sign with Red-Yellow-Green (RYG) LED Tape (Strip) lighting located on the front of the stop sign with Red LEDs on top portion of Sign, Yellow LEDs on center portion and Green LEDs on bottom portion of the sign. The sign also has holes appropriately positioned to allow mounting of stereo camera, camera, Lidar and/or Radar sensors on the rear of the sign. Solar panels located on top of the pole, with a camera attached to the front edge of the panel to view LED status on the front of the sign and a security camera mounted on the rear edge of the solar panels to detect vandalism or intrusion. A small traffic light style signal with Red LED lights on Top, Yellow in the Center and Green on the bottom portion of the sign and located on the pole to provide optimal visual signal status to drivers that are stopped at intersection thresholds. Also attached to the pole are Pedestrian Buttons and Pedestrian "WALK" signals to give pedestrians visual signal status as to when it is safe to cross the street.

Figure 3:
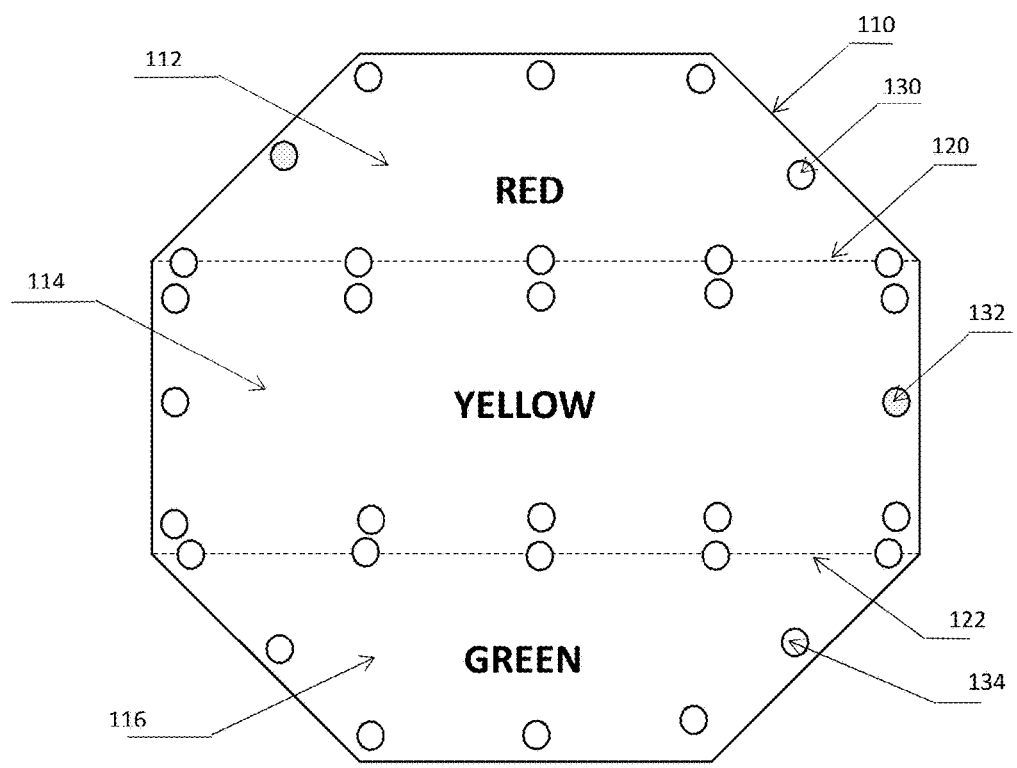
FIG. 3 shows a stop sign plate with LED lights according to another embodiment.

FIG. 3 shows Adaptive Stop Sign with LED Lights—The front of the stop sign consists of three portions, the Top Portion that part above the word "STOP" and the Vertical sides of the sign; the Center Portion that part of the sign between the vertical sides including the word "STOP"; and the Bottom Portion below the word "STOP" and vertical sides. The Top section referred to as the RED section, the Center section referred to as the YELLOW section and the Bottom section referred to as the GREEN section. LED lights (LEDs) installed to the RED—YELLOW—GREEN sections with at least 3 LEDs per periphery side and 5 LEDs per Horizontal Boundary Line with corresponding colors—Top—RED, Center—YELLOW & Bottom—GREEN. Horizontal Boundary LEDs may be dual color RED-YELLOW on top and GREEN-YELLOW on bottom. Upon activation, RED top portion, YELLOW center portion, and GREEN bottom portion, similar to existing traffic signals, providing for clear and understandable signal conditions even to color blind individuals.

Figure 4:
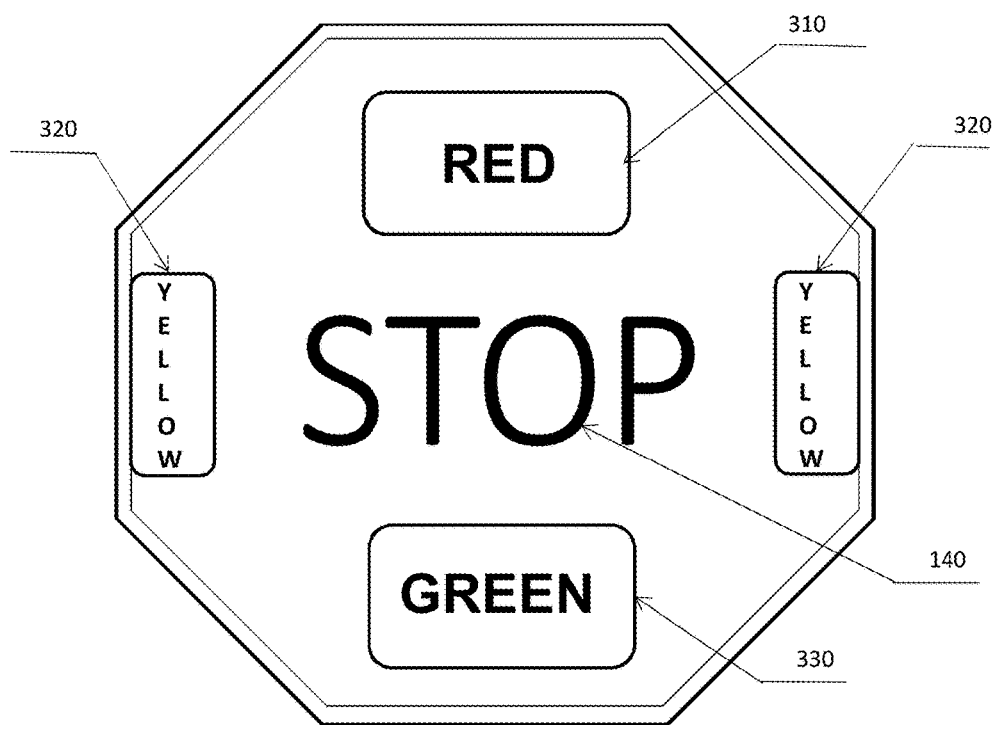
FIG. 4 shows the stop sign plate with LED light module arrays according to another embodiment.

FIG. 4 shows Adaptive Stop Sign with LED Light Module Array—Similar to FIGS. 2A-2C above with RED—YELLOW—GREEN—LED Light Module Arrays with RED on top section, YELLOW on either side of the word "STOP" in the center section, and GREEN on the Bottom section of the sign. Each LED Module Array would consist of numerous LEDs in horizontal rows for rectangular modules and circular rows for circular modules. LED Rows would consist of three independent circuits for reliability and to conserve power. For example, in a six row LED module array, one circuit could be the center two rows (rows 3&4), the second circuit the next two outer rows (rows 2&5), and the third circuit the outer rows (rows 1&6). During daylight hours all three circuits would be "ON", during evening hours with less traffic the outer rows would be "OFF" and during night hours with minimal traffic only the center rows would be "ON", thus providing a traffic signal that adapts to the operating time and condition of the day.

Figure 5:
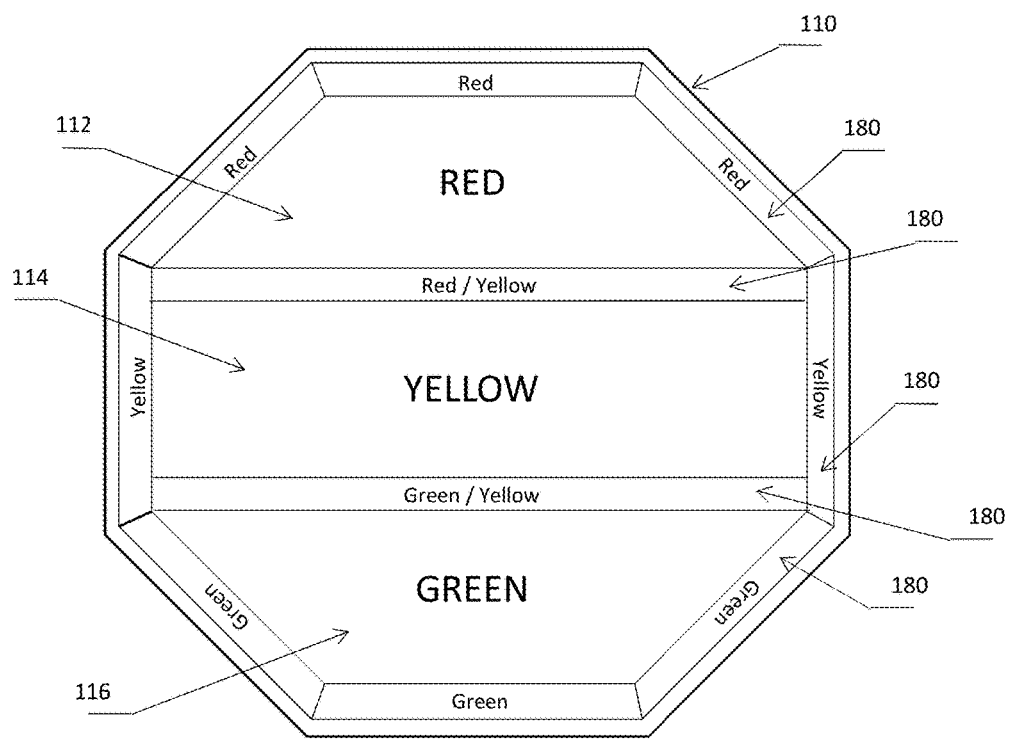
FIG. 5 shows the stop sign plate with LED light strips according to another embodiment.

FIG. 5 shows Adaptive Stop Sign with LED Tape (Strip) Lighting—The front of the stop sign consists of three portions, the Top Portion that part above the word "STOP" and the Vertical sides of the sign; the Center Portion that part of the sign between the vertical sides including the word "STOP"; and the Bottom Portion below the word "STOP" and vertical sides. The Top section referred to as the RED section, the Center section referred to as the YELLOW section and the Bottom section referred to as the GREEN section. LED tape or strip lights affixed around the periphery of the sign and LED tape or strips just above and below the word "STOP" and positioned horizontally the width of the sign extending from the vertical edge corners. The horizontal LED tape light position above would consist of dual colors—RED & YELLOW, the horizontal LED tape light position below consist of dual colors—GREEN & YELLOW. The top periphery consists of RED LED tape lights, the center periphery consists of YELLOW LED tape lights, and the bottom periphery consist of GREEN LED tape lights. Upon activation, RED top portion, YELLOW center portion, and GREEN bottom portion, similar to existing traffic signals, providing for clear and understandable signal conditions even to color blind individuals.

OLED (Organic LED) lights, tape or display panel may replace LED tape lights. OLEDs may be constructed in full display panel configurations with flexible, transparent plastic or glass material with non-reflective surface coatings providing maximum visual cues of the stop sign through the display when un-active. When active the entire stop sign would be lit by the OLED display to the appropriate status color—Top portion RED, Center portion YELLOW and Bottom portion GREEN. The other portions of the sign would be lit Gray or Black, to "Black Out" the balance of the Stop Sign. In the event of malfunction or malfunction of another intersection Adaptive Stop Sign, all intersection OLED Displays would display "STOP" in White with Red background and White periphery replicating the original stop signs. Otherwise all intersection OLED Displays would switch "OFF" and revert back to standard intersection Stop Signs. Alternatively, OLED display or displays could be placed on stop signs to cover the sign but leave the periphery and word "STOP" uncovered so vehicle headlights will fully illuminate the highly reflective portions of stop signs.

Both LED and OLED light intensity would be adaptable—during daylight hours would be highly visible to drivers in sunlight and dimmed in the darkness of night.

Figure 6:
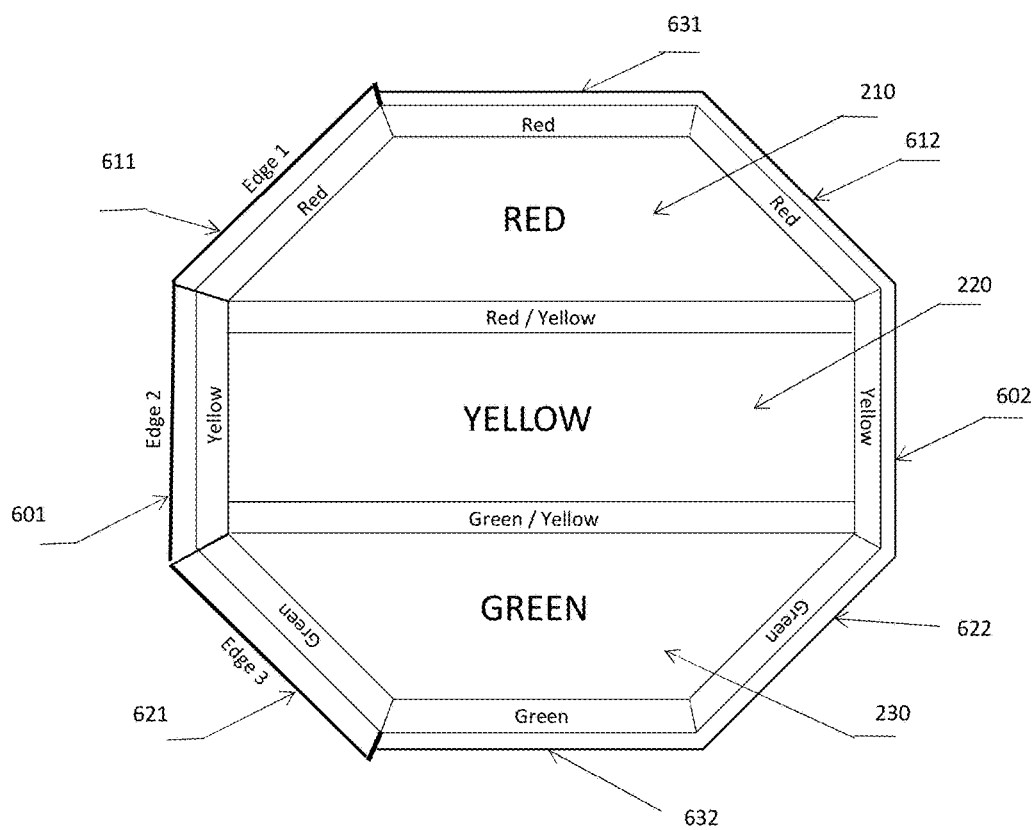
FIG. 6 shows the stop sign plate with LED light strips and Edge LED light strips provided at edges according to another embodiment.

FIG. 6 shows Adaptive Stop Sign with LED Tape Lighting. The octagonal sign consists of 8 sides. Top side (631), bottom side (632), top left side (611), top right side (612), left side (601), right side (602), bottom left side (621), and bottom right side (622). Top left side (611), left side (601), and bottom left side (621) are the "traffic side" of the adaptive stop sign. The front of the stop sign consists of three portions, the Top Portion is the part above the word "STOP" and the left side (601) and right side (602) of the sign; the Center Portion is the part of the sign between left side (601) and right side (602) including the word "STOP"; and the Bottom Portion is the part below the word "STOP" and left side (601) and right side (602). The Top section referred to as the RED section, the Center section referred to as the YELLOW section and the Bottom section referred to as the GREEN section. LED tape or strip lights affixed around the periphery of the sign and tape or strips just above and below the word "STOP" and positioned horizontally the width of the sign extending from the vertical edge corners. The horizontal LED tape light position above would consist of dual colors—RED & YELLOW, the horizontal LED tape light position below consist of dual colors—GREEN & YELLOW. The top periphery consists of RED LED tape lights, the center periphery consists of YELLOW LED tape lights, and the bottom periphery consist of GREEN LED tape lights. Upon activation, RED top portion, YELLOW center portion, and GREEN bottom portion, similar to existing traffic signals, providing for clear and understandable signal conditions even to color blind individuals.

To further enhance driver awareness of signal status, LED tape lights positioned on the driver's side edge and/or wrapped around the edges of the sign so that the edge of top left side (611) (i.e. top portion) would signal RED, the edge of the left side (601) (i.e. center portion) would signal YELLOW and the edge of the bottom left side (621) (i.e. bottom portion) would signal GREEN to drivers approaching or stopped at intersection thresholds with an edge view of the Adaptive Stop Sign. Edge lights are pointed in a sideways direction substantially perpendicular to oncoming traffic so that a driver right alongside the sign can see what the sign is indicating and so that the lights are clearly visible to the driver, where other LED lights point in an outward direction towards the oncoming traffic. LED light intensity would be adaptable. During daylight hours would be highly visible to drivers in sunlight and dimmed in the darkness of night.

FIGS. 7A, 7B &7C show LED/OLED Pedestrian Signal from Rear & Side—Walk Signals comprised of RED—YELLOW—GREEN LED lights, tape lights or OLED Panels with standard traffic signal configuration or configured for letters for "WALK". If the "WALK" configuration is implemented, the Pedestrian Signal would change colors from GREEN (Walk) to YELLOW (Caution/Don't Walk) to RED (Don't Walk). Walk signals will be clearly visible to Pedestrians crossing in either direction from the side or rear of each stop sign on the intersection and positioned behind the stop sign with an optional sun/directional shades attached. The sun/directional shade will shade Walk Signals from the sun's rays and provide a very narrow or directional view to prevent pedestrians on adjacent corners from seeing Walk signals that may conflict with their crossing direction.

Pedestrian Signal—Cross Section View from Top—"L" shaped bracket mounted on support Pole with LED Light modules attached. LED Tape Lights or OLED Panels can be mounted on the surface and eliminate the need for this module.

Figure 8B:
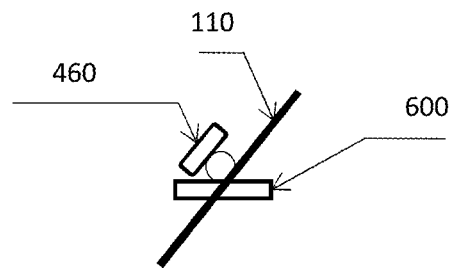
FIG. 8B shows a top view of the adaptive stop sign signal provided with the driver traffic signal according to the embodiment.
Figure 8A:
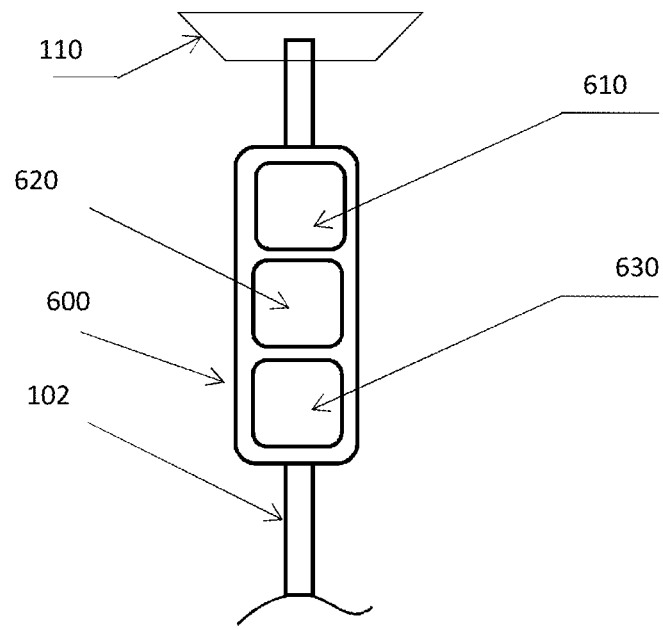
FIG. 8A shows a front view of the adaptive stop sign signal provided with a driver traffic signal according to another embodiment.

FIGS. 8A and 8B show LED/OLED Driver Traffic Signal 600 for Increased Driver Signal Visibility—Driver Traffic Signal located on support Pole underneath the Stop Sign and at a height that provides maximum driver visibility. Driver Traffic Signal comprises RED lights 610, YELLOW lights 620 and GREEN lights 630. These lights can be circular or rectangular LED lights, tape lights or OLED display panels with standard traffic signal configuration (RED—Top, YELLOW—Center, GREEN—Bottom). Driver Traffic Signals clearly visible to Drivers approaching or stopped at intersections, located below the stop sign, circular or rectangular in shape with an optional sun/directional shade attached. The sun/directional shade will shade the Driver Traffic Signals from the sun's rays and provide a very narrow or directional view to prevent other vehicles, drivers and/or pedestrians in adjacent locations from seeing signals that may conflict with their direction of travel.

Rectangular shape may be less costly to manufacture and cover more area and contain more LEDs than equivalent sized circular lights and therefore be brighter in sunlight and specific rows of LEDs may be deactivated for nighttime operation. In other words, rectangular lights with 8 LED rows could have 4 LED rows shut off at night, leaving 4 LED rows "ON" may be sufficient for Drivers Height Traffic Signals.

Figure 9:
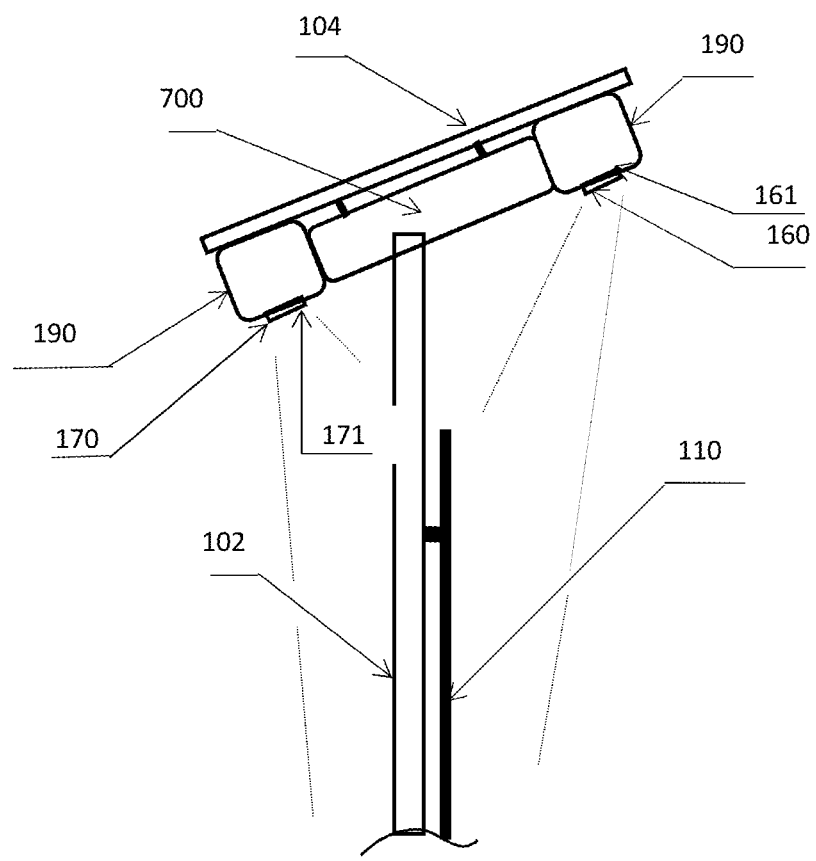
FIG. 9 shows a solar panel, a battery pack, an LED status camera and a security camera installed on the adaptive stop sign according to another embodiment.

FIG. 9 shows Solar Panel 104, Battery Pack 700, intelligent adaptive stop light monitoring camera 160, intelligent Security Camera 170 mounted on the adaptive stop signal. Solar Panel 104 is sized appropriately for power output sufficient to power the Adaptive Stop Sign, LED/OLEDs, TSCS, Sensors and charge batteries simultaneously. Battery Pack 700 sized sufficiently to provide continuous power to Adaptive Stop Sign & components for a minimum of 48 continuous hours. Solar Panel 104 and Battery Pack 700 mounted on support pole in such a manner to have one edge overhanging the front of the stop sign with an intelligent camera 160 mounted near this edge, so camera will have clear visibility to all LED/OLEDs and Tape Lights. Further, a second intelligent camera 170 mounted on the rear, so that the camera will have clear visibility of the rear of the sign to observe security intrusion violations. These cameras will provide continuous monitoring of the LED/OLED/tape lights and intrusion so that in the event of a malfunction of any of the lights or intrusion, the traffic signal control system will automatically notify the central monitoring center or maintenance personnel and shut down the system for all intersection Adaptive Stop Signs and revert to a standard stop sign intersection.

Figure 10:
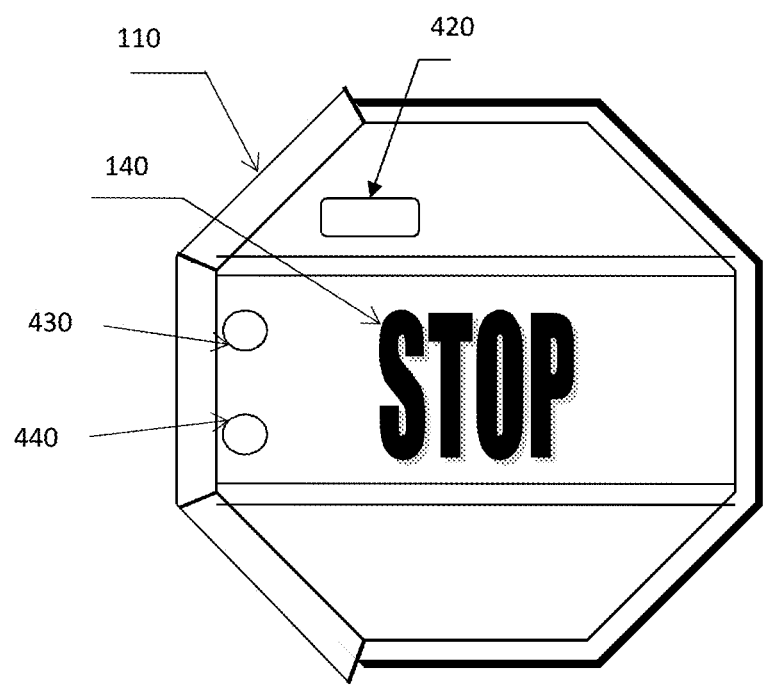
FIG. 10 shows the adaptive stop sign with LED light strips and ports for installing sensors according to another embodiment.

FIG. 10 shows Adaptive Stop Sign with LED Tape Lighting and Ports (Holes) for Sensors—The front of Adaptive Stop Signs is the same as FIG. 4 with ports or holes cut into the sheet metal of the sign to allow rear installation of sensors.

Figure 11:
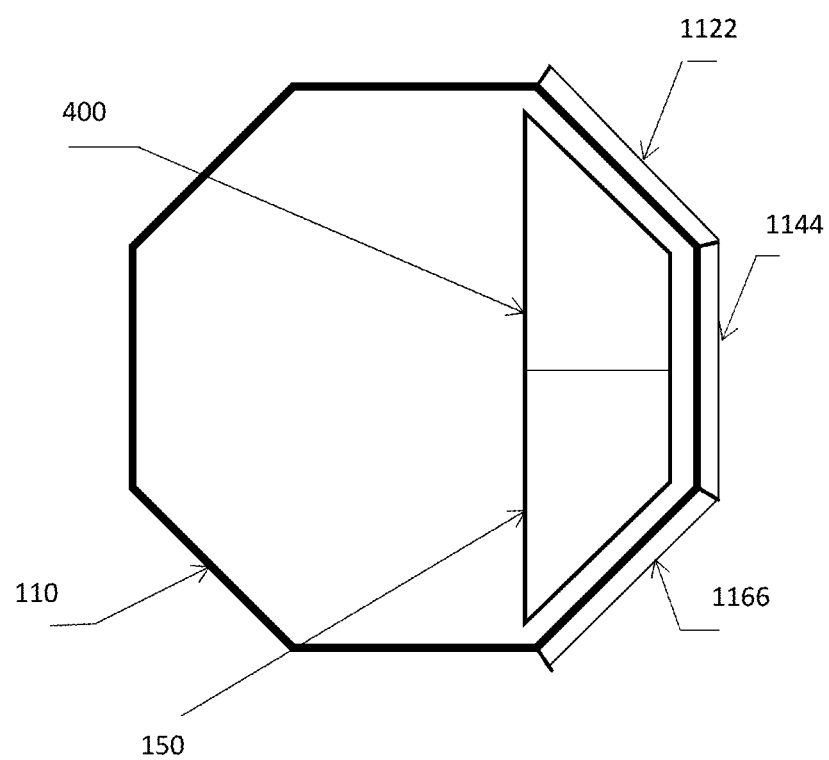
FIG. 11 shows a rear view of the adaptive stop sign with Traffic Signal Control System (TSCS) and Traffic Flow Sensor System (TFSS) module according to another embodiment.

FIG. 11 shows Adaptive Stop Sign Rear View with Traffic Signal Control System (TSCS) Module (150)—Rear view of stop sign with Traffic Signal Control System (TSCS) Module mounted on rear of sign. The TSCS Module consists of all the circuitry required to control the signal to include TFSS (Traffic Flow Sensor System) Module (400), sensors and communications. The Rear view also includes the optional LED/OLED Edge tape lights and signal status is clearly visible from the rear view.

Figure 12:
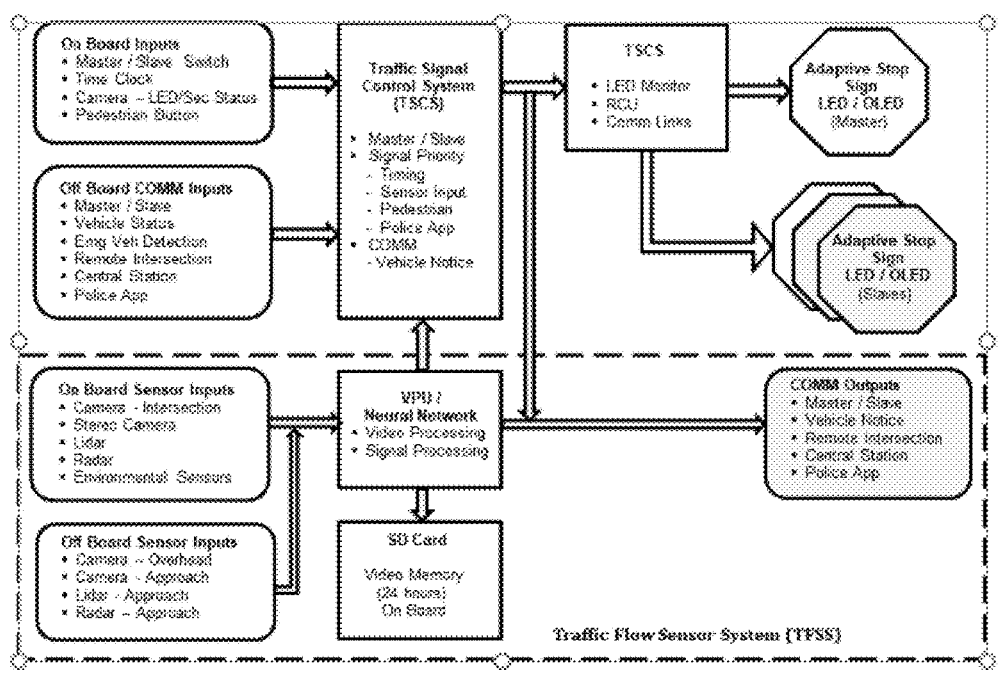
FIG. 12 shows a block diagram of a Traffic Signal Control System (TSCS) Module & Traffic Flow Sensor System (TFSS) Module according to another embodiment.

FIG. 12 shows a Block Diagram of Traffic Signal Control System (TSCS) Module & Traffic Flow Sensor System (TFSS) Modules—Traffic Signal Control System (TSCS) circuitry and/or module attached to rear or back of the Adaptive Stop Sign that will activate the LED/OLED lights in the proper sequence and time to maximize traffic flow through intersections. The TSCS consists of a CPU (Central Processing Unit) with an accurate time clock that will determine the time and sequence of LED/OLED lights (Signal), changing from GREEN to YELLOW to RED, then to GREEN to continue the cycle.

Figure 13:
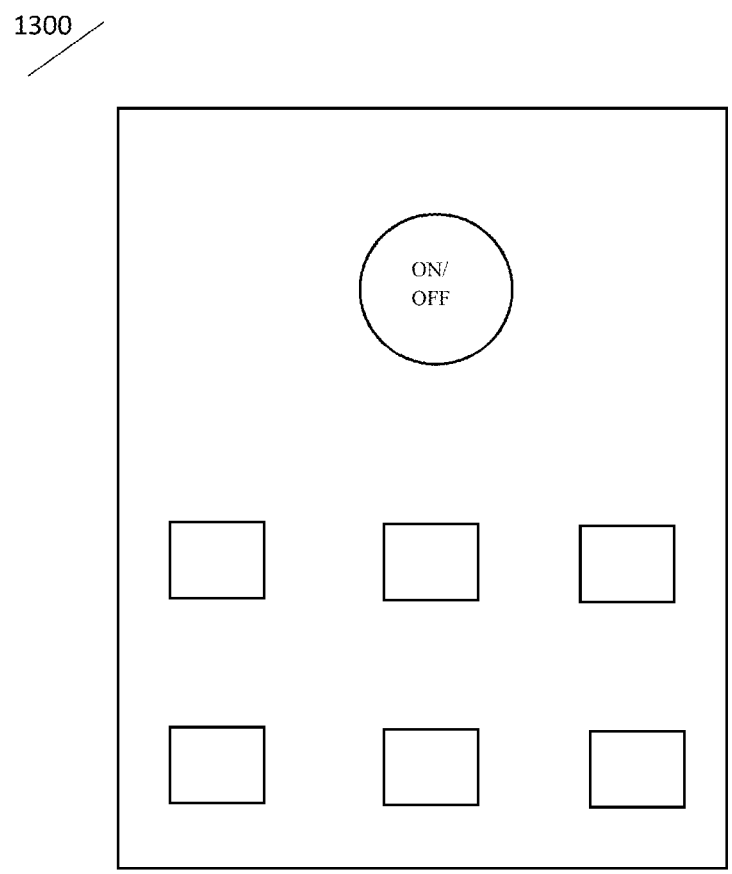
FIG. 13 shows a remote-control unit according to another embodiment.

FIG. 13 shows a remote-control unit according to another embodiment.

Figure 14:
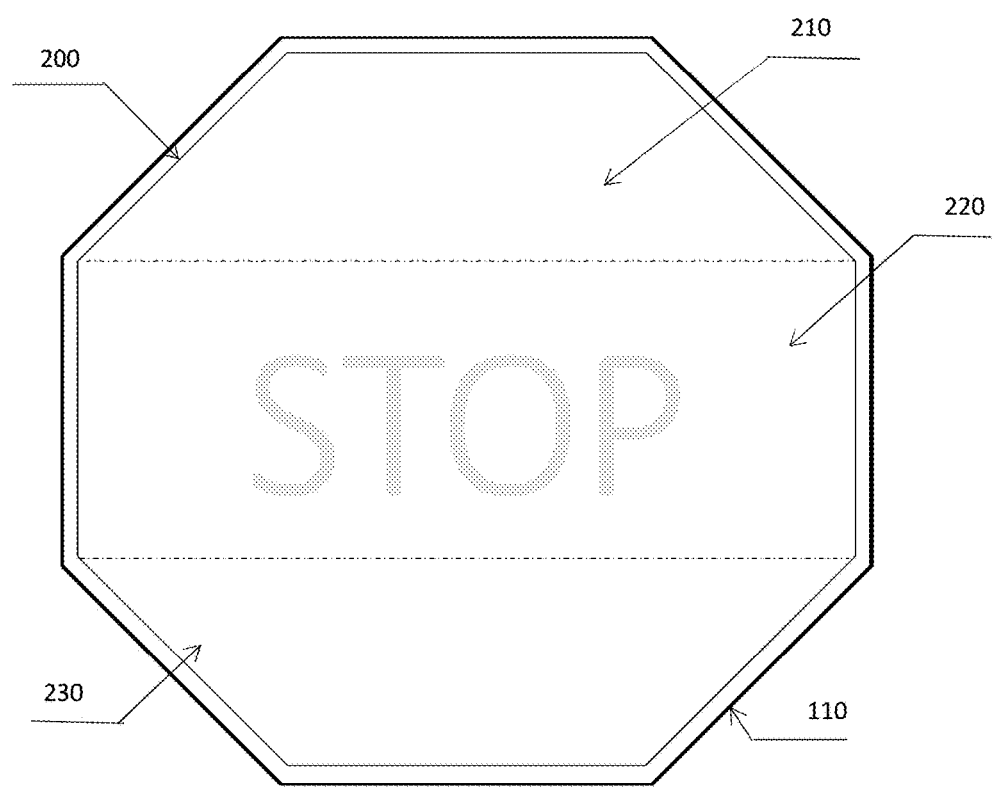
FIG. 14 shows the adaptive stop sign with OLED lighting according to another embodiment.

FIG. 14 shows Adaptive Stop sign with OLED lights according to another embodiment. In another embodiment, an Organic light emitting diode (OLED) transparent flat panel display 200 is affixed on the stop sign plate 110 such that the word STOP is clearly visible through the OLED transparent flat panel display 200 when the display is in an off state. When the OLED transparent flat panel display 200 is in an on state, the OLED display 200 works as a traffic signal display. Activating top part 210, center part 220 and bottom part 230 as necessary to signal red, yellow, or green in the respective areas and black or grey elsewhere.

TFSS Module is incorporated into the TSCS Module and attached to rear or back of the Adaptive Stop Sign, sealed to the environment, provides for video & signal processing and algorithms required for traffic flow detection, identification and analysis. The TSCS will interface directly (hard wired) with the local TFSS (mounted on Adaptive Stop Sign) and via communications links for Remote TFSSs (mounted elsewhere).

Remote TFSS to TSCS Communication links capabilities include but are not limited to technologies like Blue Tooth, Zigbee, Z-Wave and Wi-Fi, and are used to communicate with other Adaptive Stop Sign/Support Pole (local) mounted devices and off pole (remote) devices, other intersection Adaptive Stop Signs, intersection to intersection communications for signal coordination, intersection to vehicle communication for on-vehicle signal and alert status (especially autonomous or semi-autonomous vehicle systems), intersection to emergency vehicle communications for emergency vehicle priority, intersection and remote TFSS communications to central stations for monitoring and control, and remote control devices and Cell Phone Apps for maintenance personnel and police override traffic control. Specifically, the adaptive stop sign system can send signals and traffic alert messages to the vehicles. The signal can be sent wirelessly to the vehicles heading towards the intersection. Alternatively, the signals and alert messages can be shared on mobile applications. The TSCS activates the Adaptive Stop Sign LED/OLEDs and/or Pedestrian signals in the proper sequence and time to maximize traffic and pedestrian flow through intersections.

The Vision Processing Unit (VPU)/Neural Network Chip manufactured by INTEL, NVIDIA, QUALCOM, GENERAL VISION and others may be used for processing.
   a. INTEL has a VPU chip that features a Neural Compute Engine with 16 core processors each providing the ability to perform separate pipeline algorithms, sensor fusion and/or convolution neural networks all in a low power chip suitable for battery operation. The Neural Compute Engine portion adds hardware accelerators designed to dramatically increase performance of deep neural networks without comprising the low power characteristics of the chip. Known software and algorithms will be applied to this chip or others to detect, recognize and analyze vehicle presence, number of vehicles, vehicle type, location, speed and expected time to intersection threshold.

b. INTEL and GENERAL VISION both have low power chips that perform RBF (Radial Basis Function) neural networks in real time and can be considered Fast Learning (as opposed to Deep Learning) processors. GENERAL VISIONS's chips have 576 or 1024 neurons, where each neuron consists of a processor and 256 bytes of memory. Neurons can be configured in parallel or hierarchical and suitable for fast learning and provides real time image or signal detection and recognition. These processors (chips) are taught and not necessarily programmed, so programming is simplified and known by technologists in that field.

As explained above, the embodiments of the present invention convert Stop Signs into traffic signals using similar technology as implemented in Autonomous vehicles with very low power components and powered by solar panels and rechargeable batteries. A perfect example of systems implementing small, lightweight, low power and low price (SWAP) technology is technology implemented in drones and cell phones. Coupled with LED/OLED's (Organic Light Emitting Diode) on the front of stop signs and solar panel/battery packs for power, this combination could turn existing stop signs into very robust traffic control signals. Green LEDs located on the Bottom section of stop signs would be drivers "Green Light" queue, Yellow LEDs in the Center section—"Caution", and Red LEDs on the Top section—"Stop", providing similar visual and position driver queues as traffic signals. This LED/OLED signal position will give color blind drivers the same traffic signal queues they are familiar with. Additionally, in the event of malfunction, low power or control system failure, the LED/OLEDs on all intersection stop signs can be turned off and the signs get reverted to Standard Stop Signs.

Technologies used in Drones today have the ability to observe their surroundings, avoid obstacles, navigate and land autonomously. This is accomplished with Vision (EO), Infrared (IR) Cameras, Stereo Cameras, Lidar, Radar and Ultrasonic sensors coupled with very robust and compute intensive Signal & Vision Processing Units (VPUs) that provide advanced signal processing, image processing, artificial intelligence (AI) and deep Learning techniques &algorithms. All this computer power is achieved with small, lightweight, low power and low-cost packages. A technology that is a perfect fit to detect, recognize and control vehicles, bicycles and pedestrians entering intersections. The invention implements EO/IR cameras, Lidar and/or Radar sensors to detect oncoming vehicles, their speed, heading, location, size and type to include number of vehicles from all directions, analyze this data and control the LED traffic light signals to produce the most efficient intersection traffic flow. These Adaptive Stop Signs would replace existing Standard Stop Signs on each corner of an intersection.

The typical intersection has four corners and stop signs, although could vary somewhat depending on the intersections. One Adaptive Stop Sign Traffic Signal Control System (TSCS) would act as the Master Controller and the other three corners Adaptive Stop Signs TSCSs act as Slave Controllers. They would communicate with one another via RF or WiFi links, very similar to Remote Control drones and model airplanes. Adaptive Stop Sign's TSCSs would communicate with driver assisted and autonomous vehicles via RF or WiFi Links to provide cues and advise drivers and autonomous vehicles of intersection traffic signal status and when and where to stop. They would communicate with adjacent intersection traffic control systems via cell phone or long range RF links to coordinate traffic flow from intersection to intersection to maximize traffic flow. Adaptive Stop Signs would also communicate with Central Traffic Control Monitoring Centers and Police Centers to observe traffic flow and take immediate action with traffic accidents, situations or events requiring appropriate intervention.

Today's traffic control systems typically consist of a large box mounted in close proximity to one corner of an intersection and includes a multitude of computer boards or modules and programmed via Ladder Logic. This box can be very large and the system cost to install can be high, as all intersection traffic signals are wired from this controller via underground wiring. All the capability employed in standard traffic signal control systems today would be implemented in the Adaptive Stop Sign—Traffic Signal Control System, but in a significantly smaller and lower cost package. A package size equivalent to about the size of a pack of cigarettes and located on or in close proximity to the Adaptive Stop Sign being controlled.

Adaptive Stop Signs could upgrade present Stop Signs and could potentially be implemented in lieu of traffic signals, particularly at corners having difficulty justifying the cost associated with traffic signal installation.

The Adaptive Stop Sign, sensors and other components located on the support pole are powered by in ground electric utilities or by "stand alone" solar panels & batteries. The Solar Panels/Battery Pack is located at the top of the Support Pole or above the Adaptive Stop Sign with one edge of the Solar Panel protruding over the front of the sign. To insure reliable system functionality, the Adaptive Stop Sign incorporates an intelligent camera that continually monitors LED signal & timing status or LED Tape Light status on the front side of the sign. The Camera/Neural Network Module, located on the front edge of the Solar Panel/Battery Pack, would have a clear view of the front of the sign. The camera module employees neural network technology with the ability to detect and recognize LED signal and timing status and malfunctions. In the event of LED signal or timing malfunction, all intersection Adaptive Stop Signs would be turned "OFF" and revert to Standard Stop Signs.

As vehicles approach intersections Adaptive Stop Signs, their presence, speed, heading, location, size and type will be detected by any combination of video cameras, stereo cameras, LIDAR and Radar sensors located in or in close proximity to the Adaptive Stop Signs. Sensor data will be processed and analyzed by robust signal & Vision Processor Units (VPUs) and Neural Networks (NN) using deep learning techniques and algorithms to determine timing sequence and to maximize intersection traffic flow efficiency. This technology or module, Traffic Flow Sensor System Module, would be incorporated into the Traffic Control System to provide sensor input control. GREEN Lights may be held "ON" longer to allow fast traveling cars, trucks or buses through the intersection prior to changing signals. They will also be held "ON" until pedestrians or bicyclists have finished crossing intersections. Upon traffic accident or incident detection by separate overhead intersection cameras, Adaptive Stop Signs will immediately revert to RED Light Status or Stop in all directions until the intersection is cleared.

The real advantage for Adaptive Stop Signs is the ability to increase intersection traffic flow through remote sensors and fusion sensing by implementing known algorithms and artificial intelligence (AI) computing to change traffic signals and eliminate the need for road imbedded sensors, with the further ability of turning "OFF" all intersection traffic signals and systems and reverting to Standard Stop Signs in the event of power failure, low power or intersection incident.

The invention described herein is susceptible to variations, modifications and/or additions other than those specifically described, and it is to be understood that the invention includes all such variations, modifications and/or additions which fall within the spirit and scope of the above description.

I claim:

1. An adaptive stop sign, comprising:
    a stop sign plate, wherein the stop sign plate is divided into a plurality of sections;
    at least one light indicator; a traffic signal control system (TSCS);
    wherein, in an active mode the adaptive stop sign works as a traffic control signal and the TSCS switches on the at least one light indicator according to a traffic control signal;
    wherein, in an inactive mode the adaptive stop sign works as a normal sign and the TSCS switches off the at least one light indicator;
    wherein, the plurality of sections include a top section, a center section and p bottom section;
    wherein, the at least one light indicator includes at least one red light indicator, at least one yellow light indicator, and at least one green light indicator;
    wherein an imaginary top boundary line separates the top section and the center section;
    An imaginary bottom boundary line separates the center section from the bottom section;
    the top section is provided with the at least one red light indicator;
    the center section is provided with the at least one yellow light indicator;
    the bottom section is provided with the at least one green light indicator;
    a word STOP is embedded in the center section between the imaginary top boundary line and the imaginary bottom boundary line;
    wherein, in the inactive mode the TSCS switches off the at least one red light indicator, the at least one yellow light indicator, and the at least one green light indicator, and only the word STOP is visible;
    wherein the at least one red light indicator includes a plurality of red light emitting diode (LED) lights, the at least one yellow light indicator includes a plurality of yellow LED lights and the at least one green light indicator includes a plurality of green LED lights;
    further comprising an intelligent adaptive stop light monitoring camera mounted above the stop sign plate to continuously monitor the red LED lights, the yellow LED lights and the green LED lights provided in the top section, the center section and the bottom section respectively for lighting malfunction or timing malfunction; wherein in case of detecting the lighting malfunction or the timing malfunction, the intelligent adaptive stop light monitoring camera sends a malfunctioning signal indicating the condition of malfunctioning of the adaptive stop sign to the TSCS, and in-turn transmits a malfunction code to a control signal monitoring center for resolution.

2. The adaptive stop sign according to claim 1, wherein in a condition of malfunctioning of the adaptive stop sign, the TSCS switches the adaptive stop sign to work in the inactive mode.

3. The adaptive stop sign according to claim 1, further comprising an intelligent security camera mounted above the stop sign plate to continuously observe a rear side of the adaptive stop sign for detecting a security breach including vandalism, spray painting or damage to a circuitry mounted on the rear side of the adaptive stop sign; wherein the intelligent security camera is provided with a neural network module configured to detect and recognize the security breach and send a security breach code to the TSCS and in-turn transmit the security breach code to a control signal monitoring center for resolution.

4. The adaptive stop sign according to claim 1, further comprising a support pole, wherein the stop sign plate is mounted on the support pole; wherein all electrical power wiring, traffic signal control wiring, light monitoring camera wiring, and security camera wiring is enclosed within the support pole.

5. The adaptive stop sign according to claim 4, further comprising a plurality of pedestrian signs provided on sides of the support pole, wherein the TSCS controls the plurality of pedestrian signals in synchronization with the traffic control signal.

6. The adaptive stop sign according to claim 1, wherein the plurality of red LED lights, the plurality of yellow LED lights and the plurality of green LED lights provided at sides forming boundaries of the stop sign plate are disposed at edges of the stop sign plate.

7. The adaptive stop sign according to claim 1, wherein the plurality of red LED lights, the plurality of yellow LED lights and the plurality of green LED lights are provided in form of LED light strips with wide angle patterns of light distribution with a concentration of light power directed from edges of the stop sign plate to directly in a front direction of the adaptive stop sign, and vary in brightness in accordance with sunlight; wherein the light emitting diode light strips are clearly visible from a distance of at least 300 feet.

8. The adaptive stop sign according to claim 7, wherein each LED light strip includes a flexible plastic material affixed with LED lights; wherein the flexible plastic material, containing the LED lights are colored or painted to match the stop sign background color depending on where on the sign the LED light strip is mounted.

9. The adaptive stop sign according to claim 1, further comprising an Organic light emitting diode (OLED) transparent flat panel display affixed on the stop sign plate such that the word STOP is clearly visible through the OLED transparent flat panel display when the display is in an off state;
    when the OLED transparent flat panel display is in an on state, the OLED display works as a traffic signal display;
    wherein to display a red light of the traffic control signal corresponding to a stop signal, a top part of the OLED display covering the top section is activated to display red color, a center part of the OLED display covering the center section and a bottom part of the OLED display covering the bottom section are activated to display black or gray color; wherein to display a yellow light of the traffic control signal corresponding to a ready signal, the center part of the OLED display covering the center section is activated to display yellow color, the top part of the OLED display covering the top section and the bottom part of the OLED display covering the bottom section are activated to display black or gray color;

wherein to display a green light of the traffic control signal corresponding to a go signal, the bottom part covering the bottom section is activated to display green color, the top part of the OLED display covering the top section and the center part of the OLED display covering the center section are activated to display black or gray color.

10. The adaptive stop sign according to claim 9, wherein the OLED transparent flat panel display goes into the off state when the adaptive stop sign is in the inactive mode.

11. The adaptive stop sign according to claim 9, further comprising a solar panel installed on top of the adaptive stop sign, wherein the solar panel provides the electric power for the OLED transparent flat panel display and the plurality of LED lights.

12. The adaptive stop sign according to claim 9, further comprising a solar panel installed on the pole of the adaptive stop sign, wherein the solar panel provides the electric power for the OLED transparent flat panel display and the plurality of LED lights.

13. The adaptive stop sign according to claim 1, wherein the at least one red light indicator is a red LED light module affixed on the top section, the at least one yellow indicator is a yellow LED light module affixed on the center section, and the at least one green light indicator is a green LED light module affixed on the bottom section; wherein the red LED light module, the yellow LED light module and the green LED light module are rectangular or circular in shape.

14. The adaptive stop sign according to claim 1, wherein the TSCS is attached to a rear end of the stop sign plate and the TSCS activates the plurality of LED lights in a proper sequence and time to allow traffic flow through an intersection; wherein the TSCS comprises two independent hardware platforms, each independent hardware platform has a CPU (Central Processing Unit) and a time clock to determine the time and sequence of the LED lights, changing from GREEN to YELLOW to RED, and then to GREEN to continue a cycle; wherein the two independent hardware platforms include a first independent hardware platform working as a main controlling unit and a second independent platform working as a backup control unit; in case of a failure of the first independent hardware platform, the second independent hardware platform starts working as the main control unit, and a malfunction signal code is forwarded to a central monitoring station for resolution.

15. The adaptive stop sign according to claim 1, further comprising a traffic flow sensor system (TFSS) module located on the rear of the stop sign plate and integrated into the TSCS to enhance the signal timing by detecting a vehicle presence, speed of the vehicles, a heading direction of the vehicles, location of the vehicles, a turn signal status of the vehicles, a type of the vehicles, a size of the vehicles and a number of the vehicles in a traffic lane; wherein the TFSS module is integrated with the TSCS by hard wire or via a wireless communication link.

16. The adaptive stop sign according to claim 15, wherein the TFSS module comprises a plurality of sensors including a first camera for detecting vehicle data including the vehicle presence, the number of the vehicles, the location of the vehicles, the type of the vehicles, the size of the vehicles and the turn signal status of the vehicles; wherein the vehicle data is used to control the traffic signal sequence and timing; wherein the TSCS uses the vehicle data to dynamically control the traffic signal sequence and timing.

17. The adaptive stop sign according to claim 16, wherein the TFSS module further comprises a second camera, wherein the first camera and the second camera are focused on a same space to provide a three-dimensional sensing of the vehicles to determine a part of the vehicle data including the speed of the vehicles, the heading direction of the vehicles and an estimated time each vehicle will take to reach the intersection; wherein, the second camera is an EO or an IR camera.

18. The adaptive stop sign according to claim 17, wherein the TFSS module further comprises a radar for detecting the vehicle data including the vehicle presence, the location of the vehicles, the speed of the vehicles, and an estimated time each vehicle will take to reach the intersection.

19. The adaptive stop sign according to claim 15, wherein the TFSS module further comprises a lidar for detecting the vehicle data including the vehicle presence, the location of the vehicles, the speed of the vehicles, and an estimated time each vehicle will take to reach the intersection.

20. The adaptive stop sign according to claim 15, wherein the TFSS module further comprises environmental sensors to detect a weather condition data including rain, snow, fog, and blowing sand; wherein the TSCS uses the weather condition data to control an illumination of the plurality of LED lights and to enable a vision processing unit to detect, recognize and analyze the vehicle data including the vehicle presence, the number of vehicles, the type of the vehicles, the location of the vehicles, the speed of the vehicles and the expected time to reach the intersection for each vehicle.

21. The adaptive stop sign according to claim 1, wherein at least three red LED lights are provided at edges of the traffic-side of the sign along the periphery of the top section and are pointing perpendicular to the flow of traffic; wherein at least three yellow LED lights are provided at edges of the traffic side along the periphery of the center section and are pointing perpendicular to the flow of traffic; and at least three green LED lights are provided at edges of the traffic side along the periphery of the bottom section and are pointing perpendicular to the flow of traffic.

22. The adaptive stop sign according to claim 1, wherein the stop sign plate is an octagonal stop sign plate.

23. An intersection traffic control system comprising:
a plurality of adaptive stop signs installed at an intersection;
each adaptive stop sign comprises
a stop sign plate, wherein the stop sign plate is divided into a plurality of sections, at least one light indicator,
wherein, the adaptive stop sign is connected to a traffic signal control system (TSCS), wherein, in an active mode the adaptive stop sign works as a traffic control signal and the TSCS switches on the at least one light indicator according to a traffic control signal, and wherein, in an inactive mode the adaptive stop sign works as a normal sign and the TSCS switches off the at least one light indicator;
wherein the TSCS of one of the adaptive stop sign works as a master TSCS for the intersection traffic control system and the TSCS of all other of the adaptive stop signs works as slave TSCSs for the intersection traffic control system;
wherein all the TSCSs includes a Master/Slave switch allowing the master TSCS to control a timing of the at least one light indicators for the plurality of adaptive stop signs;
wherein each TSCS includes a transmitter and a receiver;

wherein the master TSCS transmits a signal code to implement a change of signal to the slave TSCSs and the slave TSCSs transmits confirmation signal codes to the master TSCS to acknowledge and verify a light change;

wherein, the plurality of sections include a top section, a center section and a bottom section;

wherein, the at least one light indicator includes at least one red light indicator, at least one yellow light indicator, and at least one green light indicator;

an imaginary top boundary line separates the top section and the center section;

an imaginary bottom boundary line separates the center section from the bottom section;

the top section is provided with the at least one red light indicator;

the center section is provided with the at least one yellow light indicator;

the bottom section is provided with the at least one green light indicator; and a word STOP is embedded in the center section between the top boundary line and the bottom boundary line;

wherein the at least one red light indicator includes a plurality of red light emitting diode (LED) lights, the at least one yellow light indicator includes a plurality of yellow LED lights and the at least one green light indicator includes a plurality of green LED lights;

wherein the TSCS is configured to communicate with other intersections, a central traffic network, emergency vehicles, and autonomous vehicles; wherein the communication is at least one selected from the group consisting of a Bluetooth communication, a Wi-Fi communication, a cell phone network communication, a wired communication, and an optic fiber communication.

24. The intersection traffic control system according to claim 23, wherein, in case the master TSCS does not receive the confirmation signal codes from the slave TSCS or receivers a slave TSCS malfunction signal, the master TSCS initiates a shut-down sequence, sending the plurality of adaptive stop signs to work in the inactive mode and a malfunction signal code is forwarded to a central monitoring station for resolution.

25. The intersection traffic control system according to claim 23, further comprising a remote-control unit for testing and verifying operations of the intersection control system remotely.

26. The intersection traffic control system according to claim 23, further comprising a remote-control unit for manually controlling the signal lights.

* * * * *